United States Patent [19]
Pearce

[11] Patent Number: 5,340,025
[45] Date of Patent: Aug. 23, 1994

[54] WIND CONTROLLED SPRAYING

[76] Inventor: George W. Pearce, P.O. Box 2, 32 Mounument St., Wenham, Mass. 01984

[21] Appl. No.: 796,620

[22] Filed: Nov. 22, 1991

Related U.S. Application Data

[63] Continuation of Ser. No. 516,278, Apr. 30, 1990, abandoned, which is a continuation of Ser. No. 341,578, Apr. 21, 1989, abandoned.

[51] Int. Cl.⁵ .............................................. A01G 27/00
[52] U.S. Cl. ............................................ 239/70; 239/1; 239/DIG. 1; 239/67; 137/78.1
[58] Field of Search .......... 239/67, 69, 70, 1, DIG. 1; 137/78.1, 78.5, 78.2; 73/188, 189; 200/61.48, 61.51, 61.52

[56] References Cited

U.S. PATENT DOCUMENTS

| | | | |
|---|---|---|---|
| 1,908,430 | 5/1933 | Lapsley | 200/61.51 |
| 2,611,051 | 9/1952 | Kolff | 73/188 |
| 2,878,098 | 3/1959 | Treloar et al. | 137/78.5 |
| 3,117,586 | 1/1964 | Cleaver | 137/78.5 |
| 3,926,369 | 12/1975 | Pearce | 239/1 |
| 4,050,629 | 9/1977 | Query et al. | 239/67 |
| 4,072,269 | 2/1978 | Berg | 239/67 |
| 4,209,131 | 6/1980 | Barash et al. | 239/69 |
| 4,326,161 | 4/1982 | Kreinberg | 315/307 |
| 4,697,737 | 10/1987 | Pearce | 239/67 |

*Primary Examiner*—Andres Kashnikow
*Assistant Examiner*—Christopher G. Trainor
*Attorney, Agent, or Firm*—Fish & Richardson

[57] ABSTRACT

Spraying apparatus for spraying a liquid into air includes a wind sensor and a sprayer. The sprayer provides a spray into the air for a predetermined time interval upon sensing only predetermined ones of the occurrences and the predetermined ones of the occurrences occurring for at least a predetermined time interval.

59 Claims, 11 Drawing Sheets

WIND CONTROLLED SPRAYING

This application is a continuing application of application Ser. No. 07/516,278 filed Apr. 30, 1990, now abandoned, which is a continuing application of application Ser. No. 07/341,578 filed Apr. 21, 1989, now abandoned.

This invention relates generally to spraying apparatus and more particularly to wind-controlled spraying apparatus.

This invention is an improvement of the invention for spraying liquids into the air for predetermined periods of time in response to changes in wind direction as described in U.S. Pat. Nos. 3,926,369 and 4,697,737 issued Dec. 16, 1975, and Oct. 6, 1987, respectively, to George W. Pearce, both hereby incorporated by reference.

The invention generally features spraying apparatus for spraying a liquid into the air. The apparatus includes a wind sensor for sensing wind from a predetermined plurality of directions at a predetermined location; an electric circuit, the electric circuit being operatively connected to a sprayer for intermittently initiating a spray into the air in response to a signal from the wind sensor.

In specific embodiments the spraying apparatus includes a printed circuit board formed with an aperture and a plurality of insulately separated fixed contacts comprising conducting pins or contact elements along the edge of the aperture generally perpendicular to the surface of the printed circuit board. A housing above the printed circuit board includes a protector for protecting the fixed contacts from environmental elements. A swinging contact may be freely suspended from a rod, string or other suitable support with a depending end intermittently in contact with a pair of fixed switch contacts when moved by the wind. The swinging contact passes through the circuit board aperture and is free to engage any one pair of fixed contacts without contacting another fixed contact. Preferably, inwardly projecting fingers between each pair of fixed switch contacts prevent the swinging contact from quickly shifting from one of the fixed switch contact pairs to another in response to small changes in wind direction.

The invention also generally features controlled spraying including sensing each occurrence of wind exceeding a predetermined velocity from a predetermined plurality of directions and intermittently providing a spray into the wind upon sensing only predetermined occurrences, the predetermined occurrences occurring for at least a predetermined time interval.

Other features and advantages of the invention will be apparent from the following description and from the claims when read in connection with the accompanying drawing in which:

FIGS. 5A, 5B, 5C-1, and 5C-2 are schematic diagrams cf control circuitry of the FIG. 1 assembly;

Figure 1:
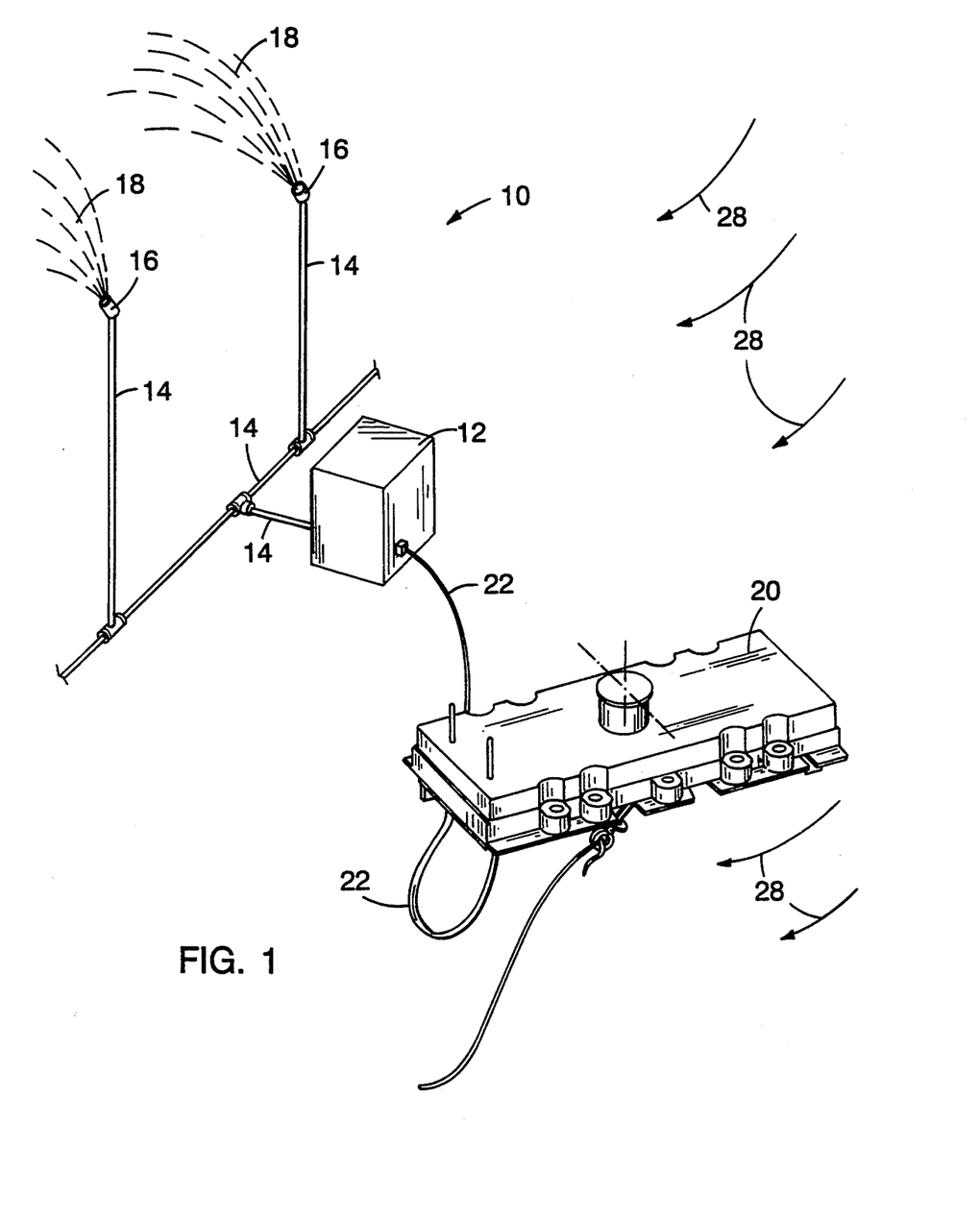
FIG. 1 is a diagrammatic representation of a spraying assembly arranged according to the invention.

Referring to FIG. 1, there is shown generally a spraying assembly 10 including a tank 12 holding a liquid, such as an insecticide solution, and having a pump for directing the liquid via conduits 14 to spray nozzles 16 to form a spray 18. Wind sensitive control system 20 sends control signals via electrical connection 22 to pump assembly 12. Control system 20 has a pendulum assembly 24 suspended from cross rod 48 with a conducting washer 38 on rod 40 that interconnects contacts in a respective pair of fixed switched contacts (not shown in FIG. 1) to activate pump assembly 12 in response to wind, shown generally by arrows 28. When activated, pump assembly 12 pumps liquid for a predetermined spraying time interval.

Activating pump assembly 12 causes the liquid to be sprayed vertically up or down so that the wind blows the spray in the contemporary wind direction for the predetermined spraying time interval. When the wind direction changes, conducting washer 38 interconnects another different pair of fixed switch contacts to cause emission of spray 18 in the new wind direction for another spraying time interval. Successive changes of wind direction will usually eventually cause interconnection of each pair of fixed contacts such that the assembly sprays the surrounding area in all directions. The number of sprayings in successive spraying time intervals in a particular direction may be controlled to establish a desired directional pattern for spraying.

Figure 2:
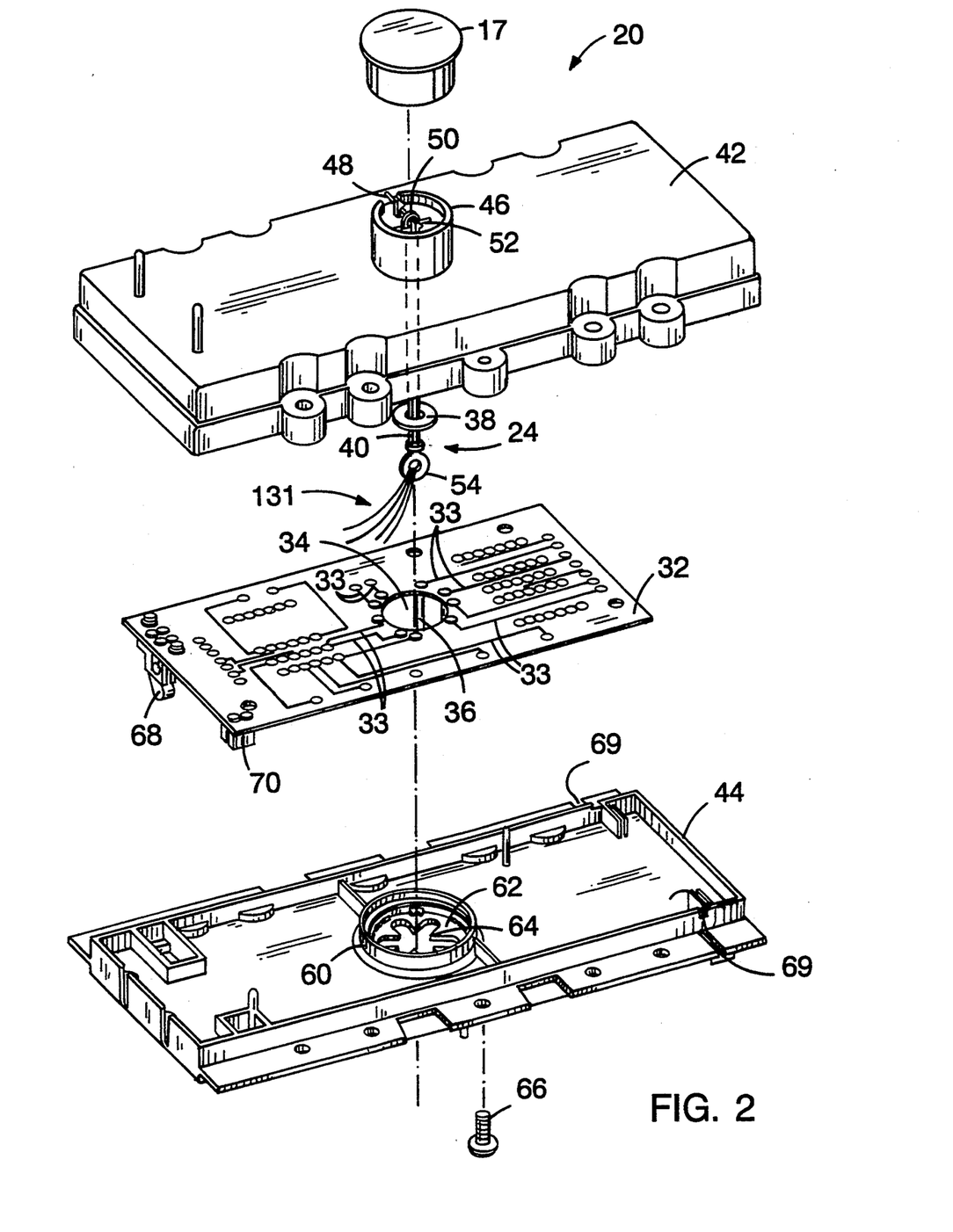
FIG. 2 is an exploded isometric view of the wind sensitive control system of the FIG. 1 assembly.

Referring to FIG. 2, wind sensitive control system 20 comprises a printed circuit (PC) board 32 having an aperture 34 through which swinging contact 24 passes. Fixed switch contacts 36 are conducting metal pins seated in PC board 32 which includes the circuitry for control circuit 33. Contacts 36 are coupled to the circuitry such that electrical interconnection of a respective pair of adjacent pins designated (A-F in FIG. 3) provides a signal representative of the contemporary wind direction to control activation of pump 12 in the manner described in the aforesaid patents. Conducting washer 38 fixed on rod 40 of pendulum assembly 24 interconnects a pair of fixed pins 36.

A plastic housing comprising lid 42 and base 44 protects PC board 32 from environmental elements, such as rain, sleet, condensation and snow. Lid 42 has a collar 46 covered by cap 47 with a rod 48. Rod 48 pivotally supports swinging rod 40 through an aperture 50. Lid 42 is formed with an elongated slit 52 through which rod 40 passes. The width of slit 52 is greater than the thickness of swinging rod 40 to allow relatively free movement of rod 40 in all azimuthal directions, and thus allow contact of washer 38 with any designated pair of adjacent fixed pins 36. Rod 40 of pendulum assembly 24 is formed with a donut-shaped end piece 54 that carries a thread or yarn 131 for receiving wind force to move conducting washer 38 towards a pair of fixed contacts 36.

Base 44 has an aperture 60 which accommodates a plastic template 62 having fingers 64. Fingers 64 guide radial movement of rod 40 to a predetermined number of angularly spaced locations about the axis of aperture 34 embraced by respective pairs of fixed contacts 36. Thus, template 62 prevents contact of conducting washer 38 with fixed contacts 36 except in defined pairs such as A-F (FIG. 3).

Housing components 42 and 44 are connected by a standard screw 66. PC board 32 has a toggle switch 68 to allow activation of wind control device 20, openings 69 for battery wires, and an input 70 for electrical input from power lines if available.

Figure 3:
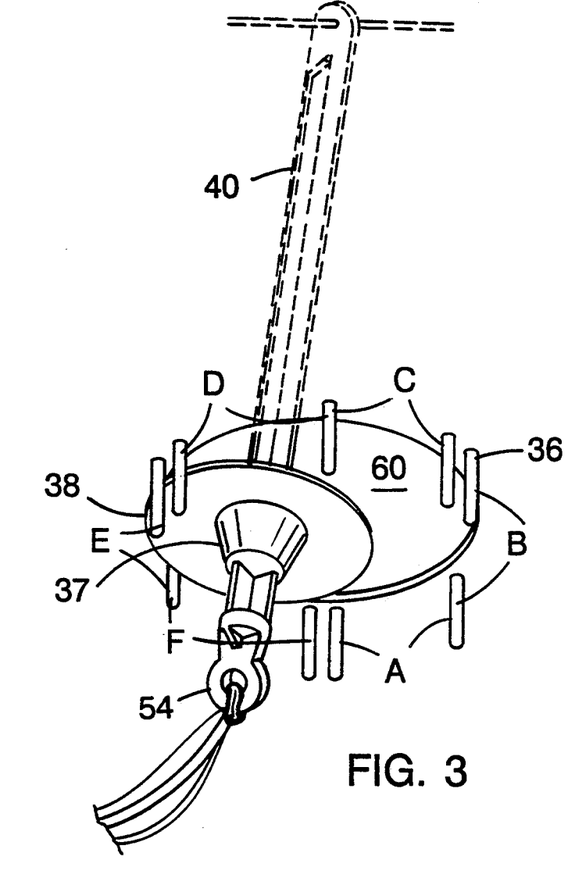
FIG. 3 is an isometric view of a swinging contact and pairs of fixed switch contacts.

Referring to FIG. 3, there is shown an oblique view of the swinging and fixed contacts looking upward with base 44 removed. Fixed contact pins 36 are arranged in designated pairs A, B, C, D, E and F such that conducting washer 38 can be brought into contact with a pair of contacts to electrically connect the designated paired contacts and thus activate pump assembly 12 (dependent upon a predetermined set of conditions). Template 62 is not shown in FIG. 3 to better illustrate the relationship between fixed and swinging contacts.

Figure 4:
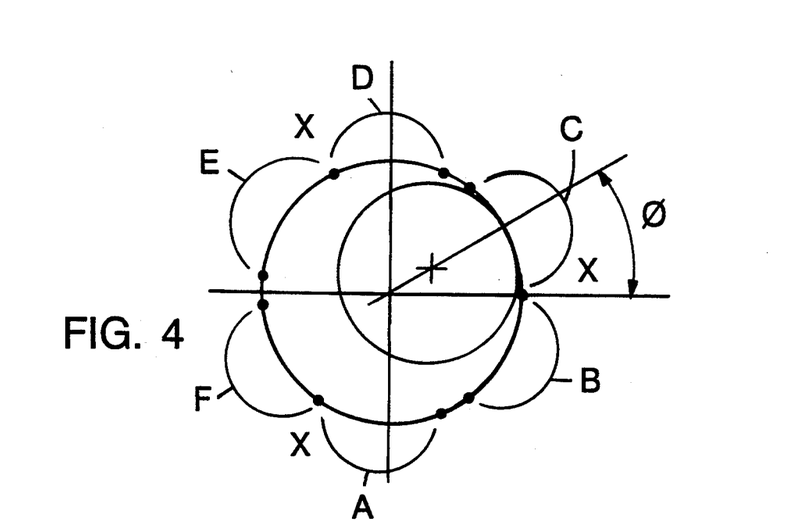
FIG. 4 is a diagrammatic representation of the relationship of the contact pins of the FIG. 1 assembly.

FIG. 4 is a diagrammatic plan view of contact pins 36 arranged to present six contact pairs using only nine pins. The three pins at the locations designated by x have a slightly larger radius than the other six pins. The angle $\phi$ is 30° and the sensed wind directions are equally spaced every 60°.

As best seen in FIG. 3, swinging rod 40 is preferably of + cross section for most of its length with the top portion flat as shown. Aperture 50 is sufficiently large relative to the diameter of rod 48 to allow conducting washer 38 to engage any pair of fixed contacts 36. Swinging rod 40 is preferably made of plastic and formed with frustoconical support 37 that carries conducting washer 38.

Figure 5A:
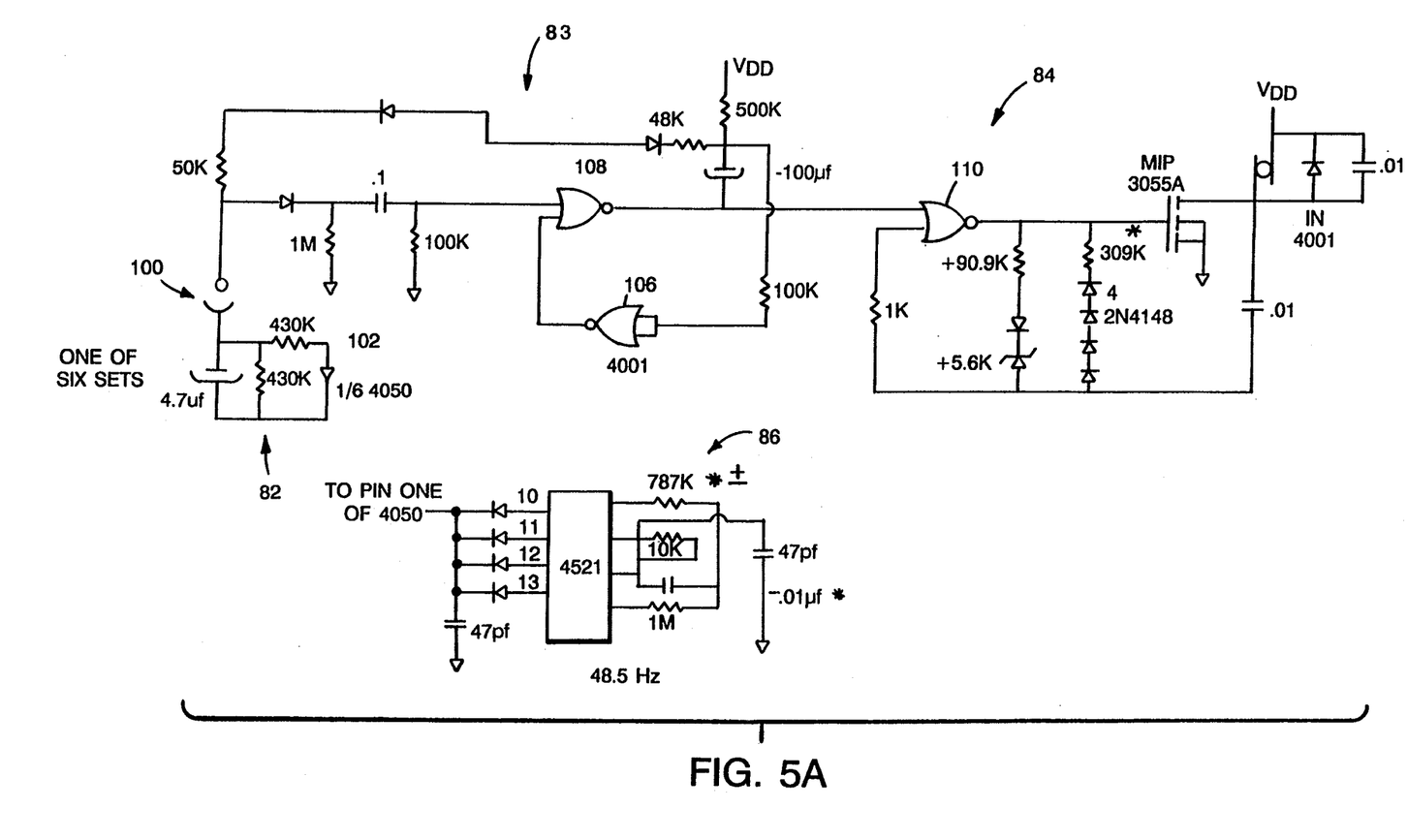

Referring to FIG. 5A, there is shown a schematic circuit diagram of one embodiment of control circuitry. This circuitry includes memory circuit 82, which is connected to contact pairs A-F (one of six is shown), switching circuit 84, and timing circuit 86, which is connected to the reset input of memory circuit 82. Wind switch 100 comprises conducting washer 38 and fixed contacts 36.

Memory circuit 82 includes buffer 102 of which there are six in a 4050 integrated circuit. The six memories are identical, and each is connected to a respective wind switch fixed contact. The output of buffer 102 is connected to its input by two 430K resistors in series. Buffer 102 is stable either in the "on" or "off" state, high voltage or low voltage, respectively. When first powered up, each buffer 102 is in the low state. A 4.7 microfarad condenser shunts one 430K resistor with its negative side connected to the output of the buffer.

When wind switch 100 closes, current through the 50K resistor begins charging the 4.7 microfarad condenser. If wind switch 100 remains closed for a predetermined time interval, e.g., about a third to two thirds of a second, the 4.7 microfarad condenser charges to a value that exceeds half the power supply voltage. Then buffer 102 shifts to change the memory state to be representative of wind direction associated with that memory. i.e., when the input voltage of buffer 102 becomes above one-half of the power supply voltage, typically switching occurring just above ⅝ power supply voltage, or at 9/16 power supply voltage for many CMOS devices, both the input and output of buffer 102 go positive.

When the memory state shifts, both sides of the 4.7 microfarad condenser rise in voltage. Because the condenser has a charge on it, the positive supply side of the condenser rises above the power supply momentarily. This positive pulse is fed back through the wind switch, reversing the voltage across the 430K resistor. This positive pulse then passes through a diode and through the 0.1 microfarad condenser to the input of one of the gates of the 42-second timer.

This 42-second timer establishes the spraying time interval and includes NOR gates 106, 108. Inputting the high signal outputted from the wind switch to NOR gate 108 makes the output of gate 108 go low. This shift causes the lower side of the 100 microfarad condenser to go low and pull the higher side down with it. This condenser then begins to charge through the 500K resistor. This shift carries the inputs of NOR gate 106 to low. The output of gate 106 then goes high and keeps the output of gate 108 low and locks gate 108 in the triggered position. Because the first input coming from the wind switch is a pulse (because it goes through the 0.1 microfarad condenser), gate 108 has one input low and one input high, and thus its output is low. As the 100 microfarad condenser charges through the 500K resistor, this condenser reaches a point where its plus side voltage becomes above onehalf of the supply voltage, NOR gate 106 then shifts, bringing its output back to high. Then the 100 microfarad condenser rapidly discharges through the 48K resistor. Accordingly, the device advantageously cannot spray unless the memory state shifts to indicate a change in wind direction because the shifting of the memory state triggers the spray.

Timing circuit 86 comprises a 4521 CMOS chip with an oscillator, a counter, a grounded reset input and several outputs. The 0.01 microfarad condenser and 787K resistor establish an oscillating frequency of 48.5 Hz. Outputs 10, 11, 12 and 13 are coupled to the 47 pf capacitor so that when the count reaches $2^{18}$, this capacitor is charged to a predetermined positive potential and remains so charged through a count of $2^{21}$. The 4050 CMOS chip, which is used for six memories 82, derives its positive power supply from timing circuit 86. When the device is first turned on and the 4521 chip is first energized, it must count $2^{18}$ cycles before the memory chip receives any power. It remains powered until the count reaches $2^{21}$. This circuitry results in power being cyclically off and on for a duration of 47 minutes and 12 hours, respectively.

The long off duration is a desirable safety feature. When the device is first turned on, it may be undesirable to have it spray immediately because the device may still be in the hands of the installer.

The output of the first 42-second timer gate 108 is carried to switching circuit 84 to control operation of the pump motor. Switching circuit 84 includes NAND gate 110 whose output is high only when both inputs are low. When the device is not spraying with the pump motor off, the upper input leg is high, its output is low, and the charge on the 0.01 condenser drains through the four 2N4148 diodes and the 309K resistor to make the lower input leg of gate 110 low. When the output from the 42 second timer goes low, both input legs of gate 110 are low and its output goes high. This shift raises the gate of the 3055A FET to high potential, and current from the $V_{DD}$ terminal flows through the motor to ground. This shift produces a negative pulse through the 0.01 condenser to the lower input leg of gate 110. This feedback causes oscillations at a frequency determined by circuit parameters.

The duty cycle of the oscillation is determined by the network connected to both the 90.9K and the 309K resistor Because of the effect of the four diodes in series and of the 5.6 volt Zener diode, the duty cycle of this oscillation varies with voltage (i.e., the higher the voltage, the lower the percentage of a cycle in which the motor is on). This variation of duty cycle with voltage regulates the power delivered to the motor and results in a more steady pressure on a spray nozzle throughout the life of the batteries and additionally conserves battery power.

When the gate of the FET is positive, e.g., at higher voltages, current flows through the 5.6 volt Zener causing the charge on the .01 condenser to be dissipated more rapidly at high voltages. A similar effect occurs through the 309K resistor but in the reverse direction.

A condenser and diode across the motor filters out most of the static generated by the motor. Because the 50K resistor above the wind switch is not connected to $V_{DD}$ but through a diode to the output of gate 106, it is possible to initiate a cycle of memory trip-spray as long as this output is high. During spray this output is low so no memory can be tripped.

Under conditions of light winds the resistance across the pair of wind switch pins contacted by conducting washer 38 can be quite high, e.g., about 90K. This resistance is low enough to trip the memory but not operate the motor. This is a desirable condition. Otherwise with light winds, spraying might occur over and over without tripping the memory. These two resistance values for tripping memory and operating motor are preferably relatively close together, but the circuitry preferably causes the motor to always trip at a lower resistance than the resistance which allows the memory to trip.

In the circuit of FIG. 5A when a memory trips, the 4.7 microfarad capacitor has a charge of slightly above half supply voltage. Hence, the higher terminal of this capacitor is at about 1½ supply voltage immediately after tripping.

Figure 5B:
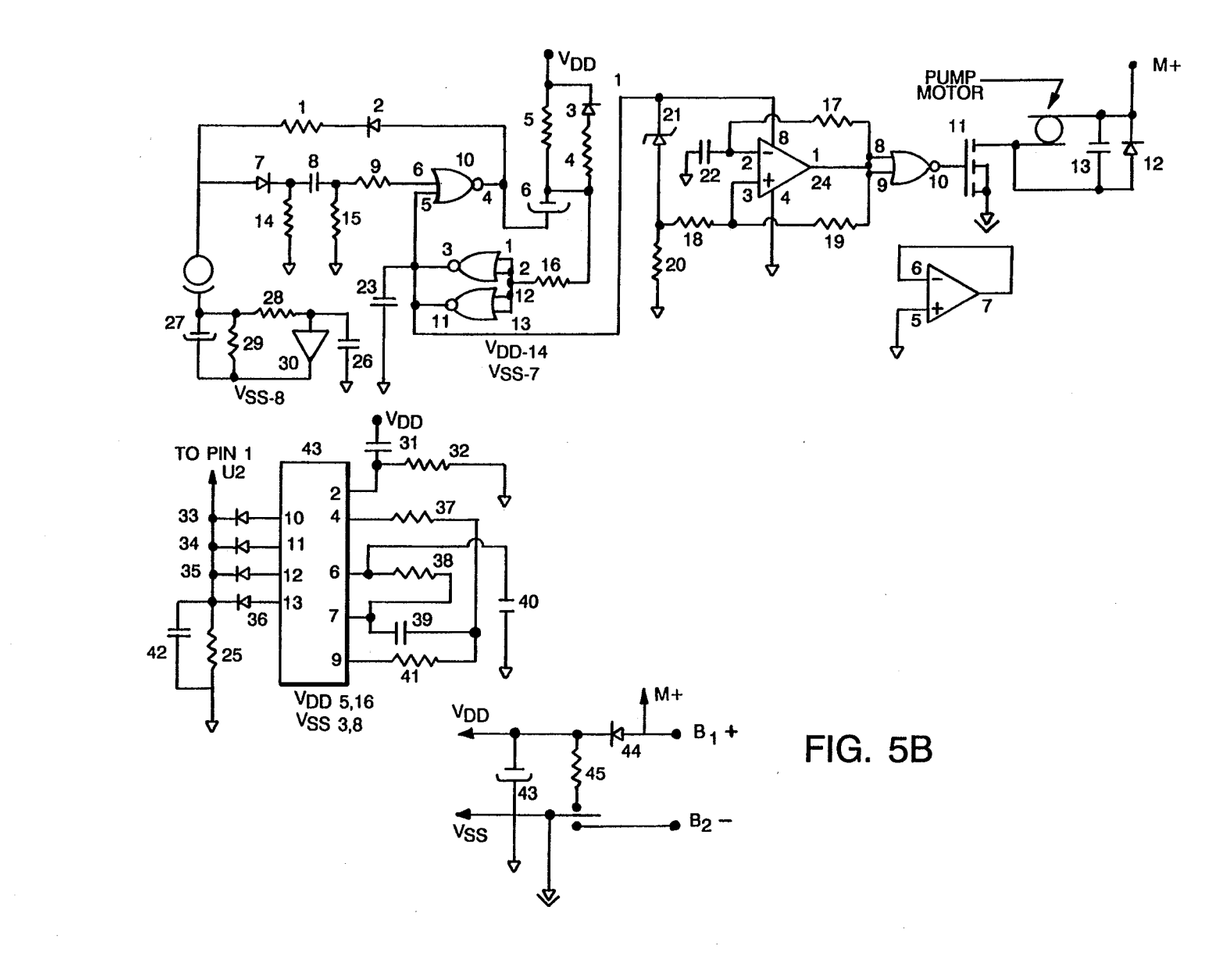

Referring to FIG. 5B, there is shown a schematic circuit diagram of a another embodiment of the control circuit. This circuit differs from the circuit of FIG. 5A primarily in the voltage control circuit and selection of preferred component values. Those skilled in the art may readily build an actual working model of the control circuit using the components designated in FIG. 5B.

Figure 5C:
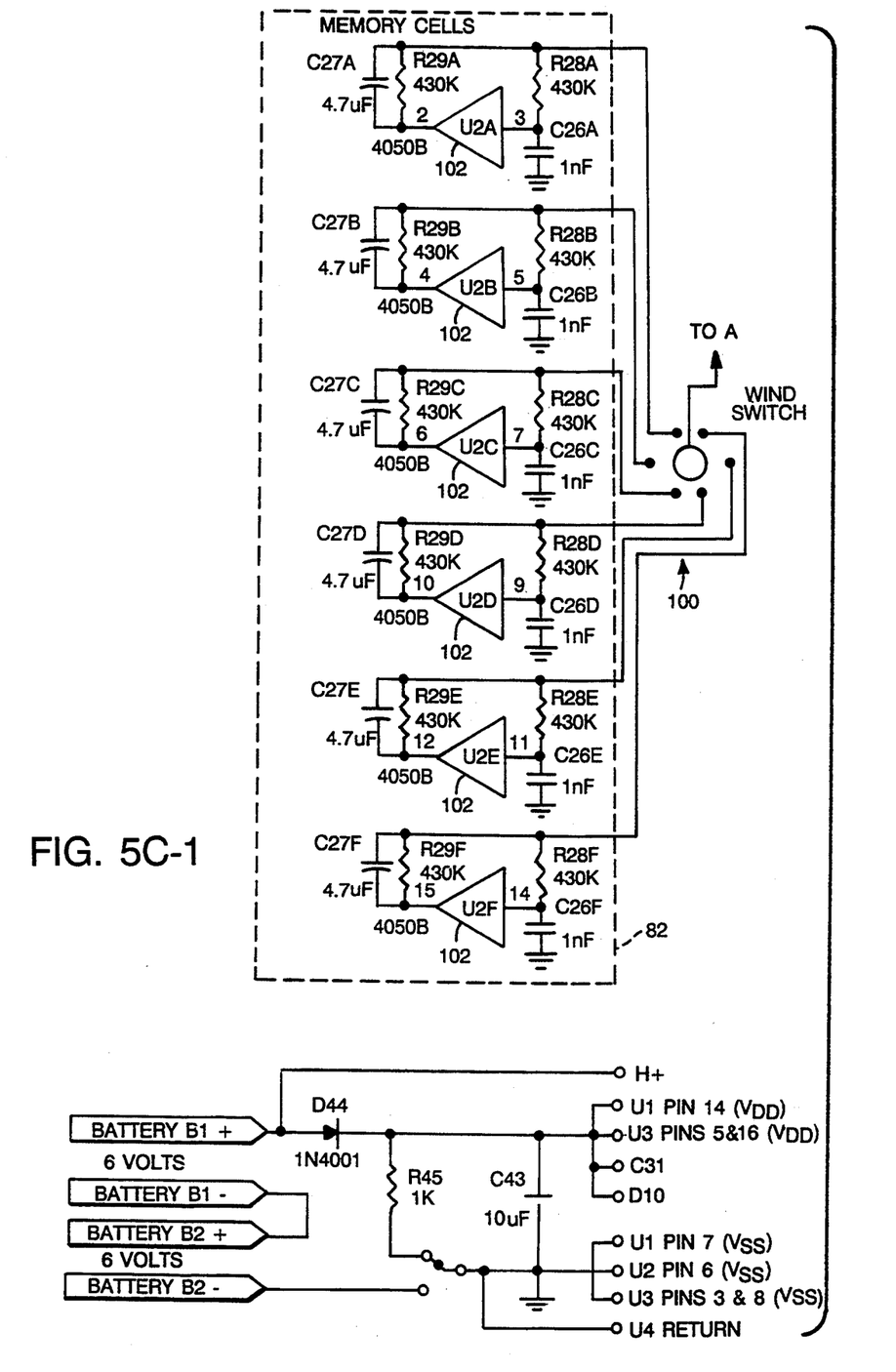
Figure 5C:
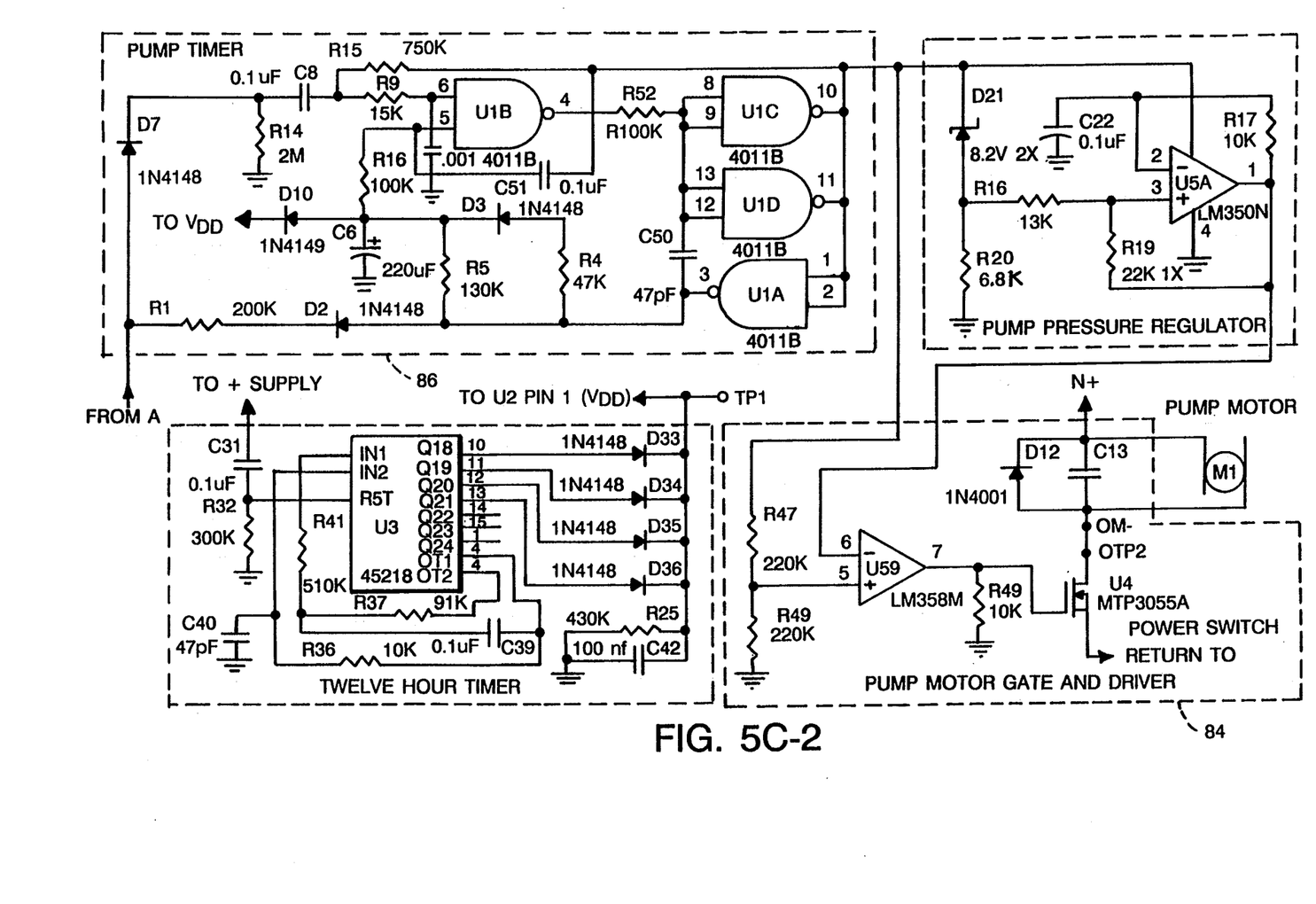

Referring to FIG. 5C, there is shown a schematic circuit diagram of a preferred embodiment of the control circuit. This circuit differs from the circuit of FIG. 5B primarily in the selection of some different preferred component values. Those skilled in the art may readily build an actual working model of this embodiment of the control circuit using the components designated in FIG. 5C.

The resistor connected to terminal 4 and the capacitor connected to terminal 7 of the 4521B integrated circuit U3 are selected to establish an oscillation frequency of 48.5Hz±4%. The resistor and capacitor connected in series between $V_{DD}$ and terminal 4 of the 4001B integrated circuit U1 are selected to establish a spray interval of substantially 30 seconds for the pump motor being on.

It is preferred that the conducting paths on the circuit board go directly from $B_1+$ to the motor + terminal. The source terminal of FET U4 preferably is connected directly to the power switch as shown. This circuit arrangement helps avoid having large currents from the circuit board causing voltage fluctuations in the control circuit. Preferably no part of the control circuit is connected to these conducting paths which draw heavy current.

The preferred circuit of FIG. 5B has a number of advantages. The spray timer is arranged such that the 220 µf capacitor is fully charged except when a spray is being timed. Thus, the timed interval always begins with the same initial condition on this capacitor.

The following table sets forth the relationship in a specific embodiment for battery voltage between terminals $B_1+$ and $B_2-$ and pump pressure in pounds per square inch. For a reduction in battery voltage of 50%, there is only a reduction in pressure of about 15%. This advantageous result occurs because the duty cycle of the current pulses delivered to the pump motor increases with decreasing battery voltage. The two feedback paths in the pump timer circuit provide a snap-action turn-off even though the turn-off may be triggered by a very gradual decrease in voltage on pin 5 of integrated circuit U1. The pump regulator circuit is relatively free of complexity. The network at the on-off switch drains the control circuit of all power and insures that when the device is turned on, the memories power up untripped, and the 12-hour and 30-second timers power up reset.

| VOLTS $B_1+$ $B_2-$ | PUMP PRESSURE P.S.I. |
| --- | --- |
| 8.0 | 36.7 |
| 8.5 | 39.2 |
| 9.0 | 42.4 |
| 9.5 | 42.7 |
| 10.0 | 43.2 |
| 10.5 | 43.2 |
| 11.0 | 43.2 |
| 11.5 | 43.1 |
| 12.0 | 43.0 |
| 12.5 | 42.8 |
| 13.0 | 42.7 |
| 13.5 | 42.6 |
| 14.0 | 42.5 |
| 14.5 | 42.5 |
| 15.0 | 42.5 |
| 16.0 | 42.5 |

Figure 6A:
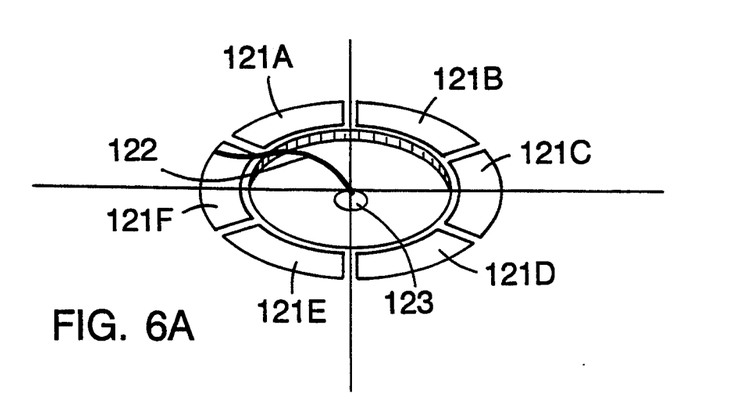
FIG. 6A is a diagrammatic plan view and FIGS. 6B and 6C are diagrammatic elevation views of an embodiment of the invention for introducing delay mechanically.
Figure 6B:
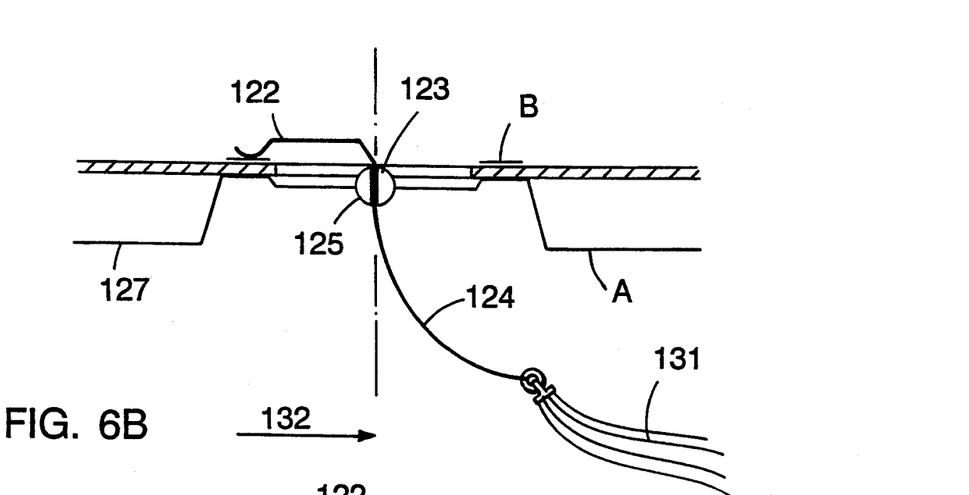
Figure 6C:
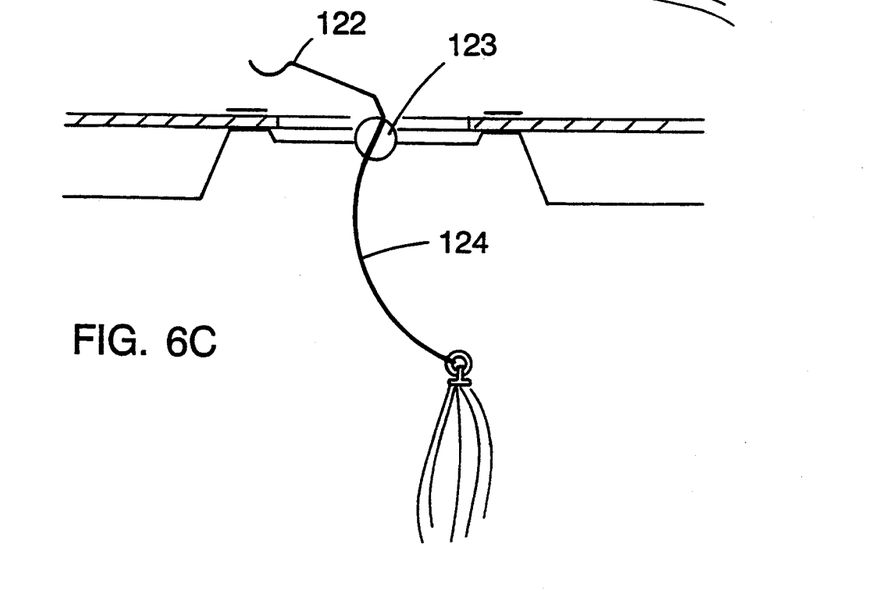

Referring to FIG. 6A, there is shown a diagrammatic plan view of another switch embodiment of the invention characterized by mechanical delay and shown in diagrammatical elevation in FIG. 6B with wind and in FIG. 6C without wind. Preferably, spherical ball 123, pocket 126 in undercover 127 in which it is seated, the portion of movable contact 122 that contacts the fixed contacts 121A–121F and these fixed contacts are preferably gold plated or solid silver. This switch embodiment includes six stationary switch contacts 121A, 121B, 121C, 121D, 121E and 121F and associated leads corresponding to six different wind directions. A moveable contact 122 is seated in the ball 123 of a spherical pivot having a depending spring wire 124 passing through an opening 125 in recess 126 in sheet metal 127. A piece of yarn 131 is connected to the end of spring wire 124. With wind blowing in the direction indicated by arrows 132, yarn 131 moves to the right and causes moveable contact 122 to engage one of fixed contacts 121A–121F corresponding to the wind direction then blowing and establish conductive contact between sheet metal undercover 127 and that fixed contact. FIG. 6C shows how in the absence of wind spring wire 124 and yarn 131 are substantially directly below spherical ball 123 so that moveable contact 122 then engages no fixed contact. When the wind begins to blow, there is a delay between the time the wind begins to blow and the time moveable contact 122 actually engages a fixed contact. This delay results at least in part from rotation of the wire-yarn-contact assembly about the vertical axis in response to a new wind direction before contact occurs. This rotational delay may be used as an alternative to or a supplement of electrical delay in electrical circuitry described above.

Figure 7A:
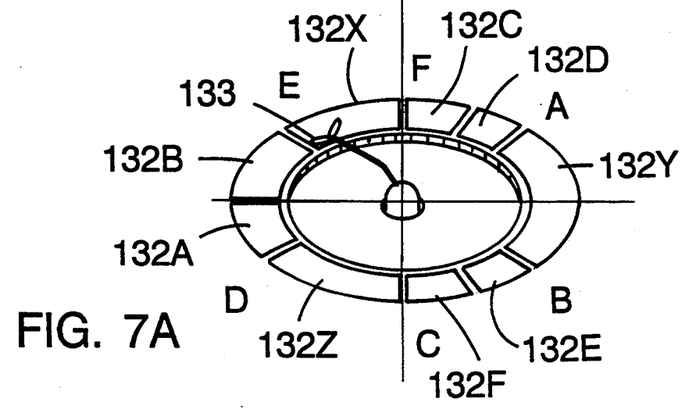
FIG. 7A is a plan view of another contact arrangement.

Referring to FIG. 7A, there is shown a diagrammatic plan view of still another switch embodiment according to the invention. In this embodiment there are three equiangularly spaced wide fixed contacts 132X, 132Y and 132Z. Each of these wide contacts is flanked by a narrow contact 132A, 132B, 132C, 132D, 132E and 132F. A moveable contact 133 bridges a wide contact and an adjacent narrow contact to provide a signal representative of one of six wind directions.

Figures 7B, 7C:
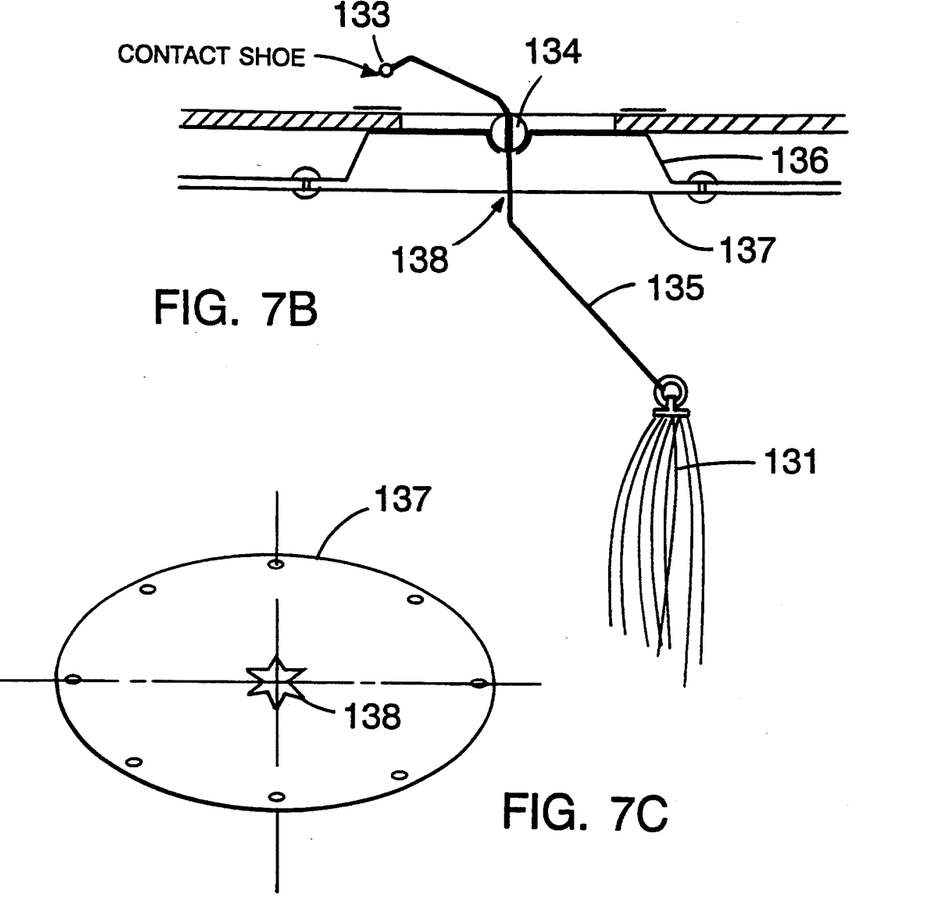
FIG. 7B is a diagrammatic elevation view thereof and FIG. 7C is a plan view of a guide plate used in another embodiment for introducing mechanical delay.

Referring to FIG. 7B, there is shown a diagrammatical elevation view of this switch embodiment. Spherical ball 134 carries depending spring wire 135 to which yarn 131 is attached as in the embodiment of FIGS. 6A, 6B and 6C; however, this spherical pivot comprises a socket or seat formed in an upstanding dish-like member 136. A side template 137 with a six-point star-shaped opening 138, best seen in FIG. 7C, is positioned as shown to guide spring wire 135 toward a respective point that establishes one of the six wind directions.

The mechanical delay furnished in the embodiments of both FIGS. 6A, 6B, and 6C and 7A, 7B, and 7C is related to the time required to rotate the pendulum comprising spring wires 131 and 135 before contact is made.

Figure 8:
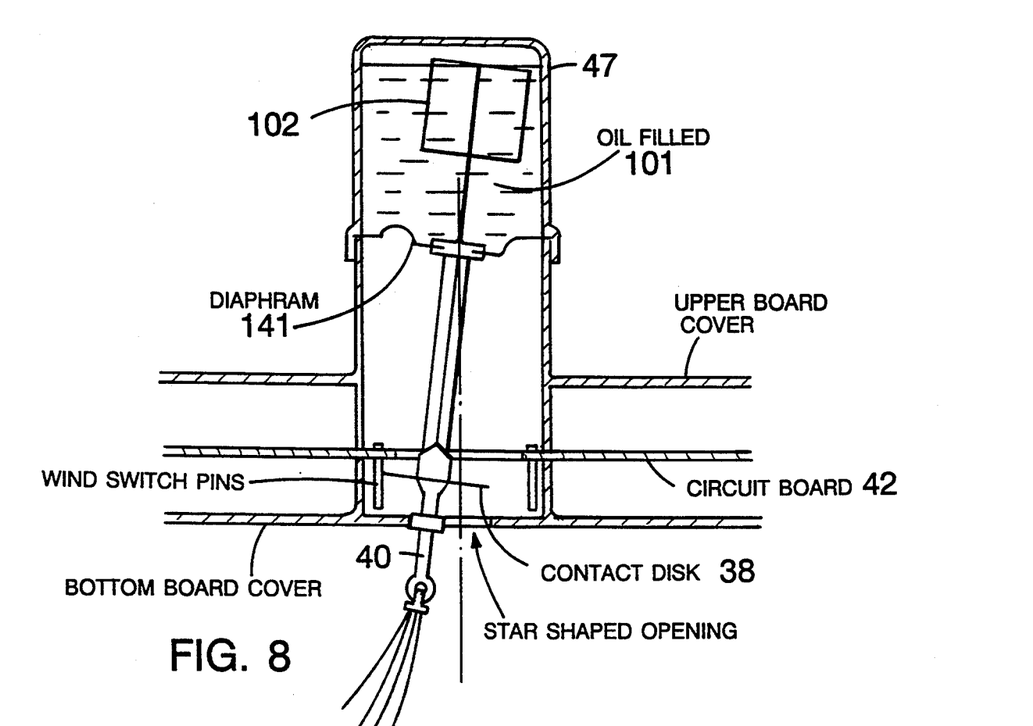
FIG. 8 is a diagrammatic elevation view of another embodiment of the invention for introducing mechanical delay.

Referring to FIG. 8, there is shown another embodiment of the invention representing a modification of the structure of FIG. 2. However, instead of pivoting pendulum 40, in lid 42, diaphragm 141 allows movement of pendulum 40. Pendulum 40 extends upward into damping fluid 101 and carries vanes 102 that coact with the fluid to dampen movement and delay the response of pendulum 40 to the wind.

Figure 9:
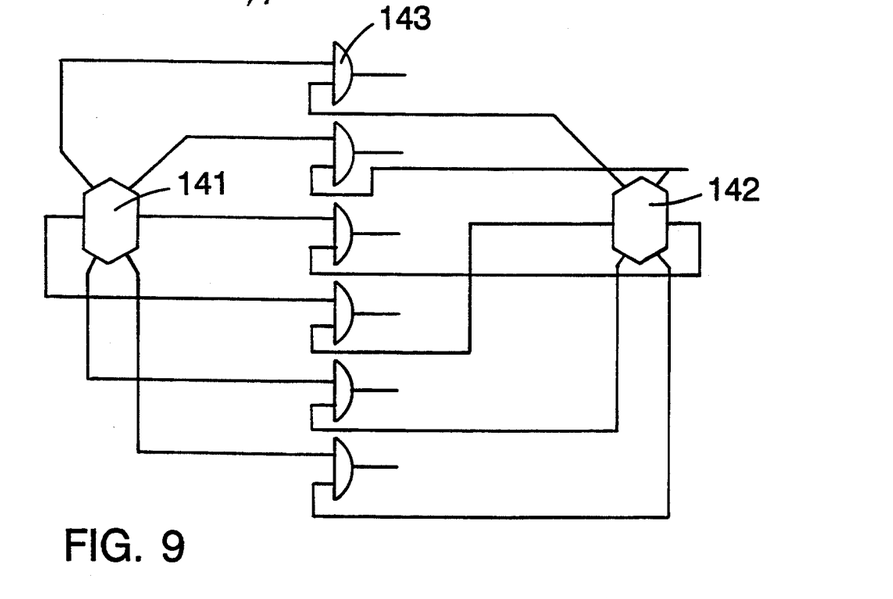
FIG. 9 is a block diagram illustrating the logical arrangement of an embodiment of the invention having spaced wind switches for effecting spraying only when both spaced switches sense the wind in the same direction at the spaced locations.

Referring to FIG. 9, there is shown a block diagram illustrating the logical arrangement of a system according to the invention having two spaced wind-direction-sensing switches 141 and 142 each of which have six output lines corresponding to a respective wind direction coupled to respective inputs of AND gates 143. Each facet of the hexagons representing switches 141 and 142 corresponds to a respective one of the six wind directions capable of being sensed so that a respective gate provides an output signal only when switches 141 and 142 simultaneously sense the wind from the same direction.

Figure 10:
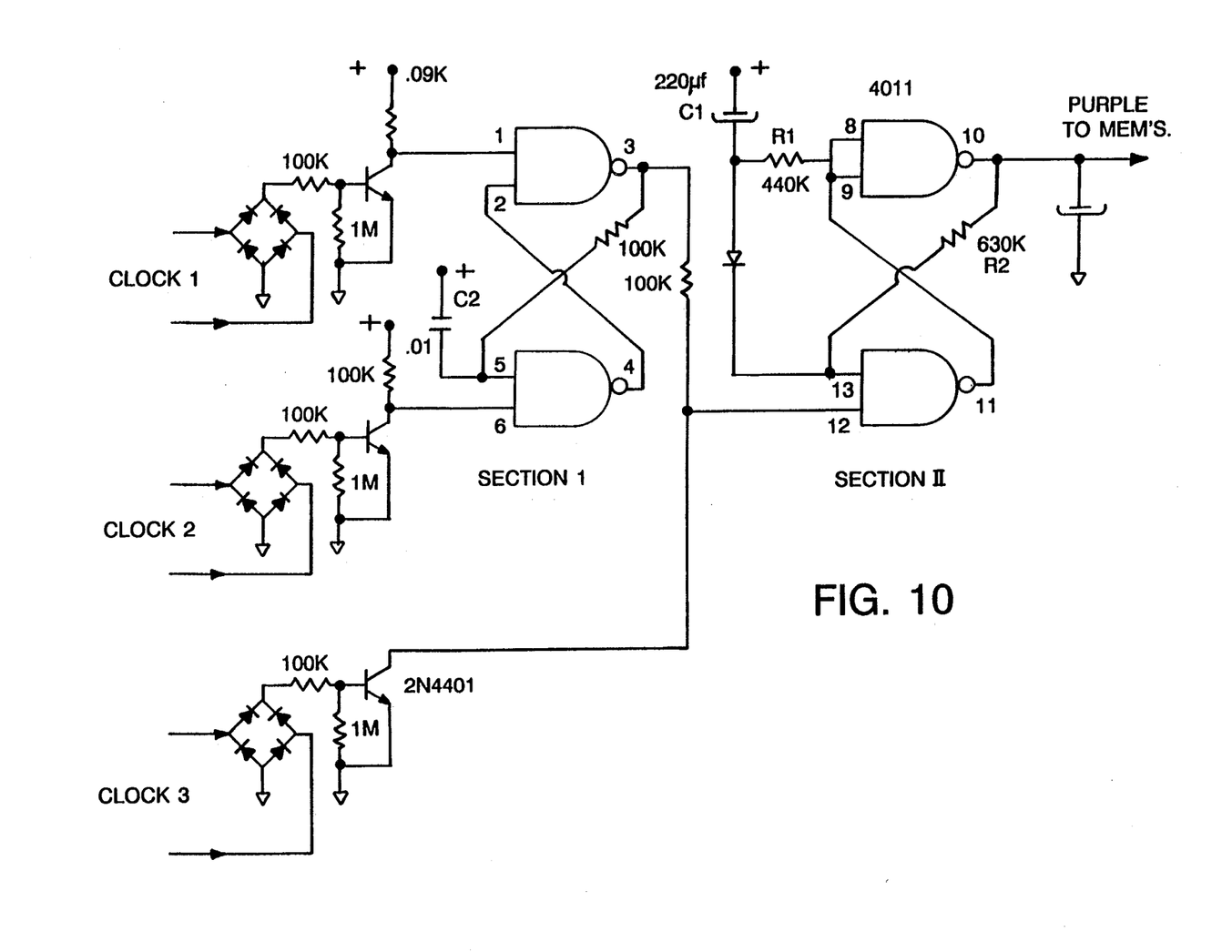
FIG. 10 is a schematic circuit diagram of an alternate embodiment of the invention using clock control.

Having discussed a number of embodiments of the invention, it is helpful to consider certain principles of operation. Typically preferred embodiments involve five time intervals convenient to designate by letters A–E. The A or detection time interval is a predetermined time interval in which no spray occurs but during which the wind must persist in one direction. The B or spray time interval is a predetermined time interval in which spray occurs immediately after the detection time interval. The C or active time interval is a predetermined time interval in which the memories record the direction of the winds in response to which spraying has occurred; and after which the stored directional information in the memories is cancelled. The C time interval can contain several A and B time intervals but embrace no D or F time intervals. The D or reset time interval is a predetermined time interval in which the memories are maintained at an unset state and no spraying can occur. The E or safety time interval is a predetermined time interval starting with the switch "on" of the device in which no spraying can occur. This interval is established for safety reasons. When the user first installs the device or lowers it to refill the tank, and turns it "on" before elevating it to its operating position, no spraying should be possible until after the device is in its operating position. Otherwise, the device could spray directly upon the installer.

It has been discovered that a preferred range of the A detection time interval is between $\frac{1}{2}$ and $\frac{1}{3}$ second. Longer times may be acceptable, but preferably no longer than 20 seconds.

The B interval is preferably that time interval needed to dispense a desired amount of insecticide or other substance being dispensed. In locations where there is turbulence, the B interval is preferably short enough so that the wind is less likely to change direction during this interval. For short B time intervals it is preferable to use nozzles with higher flow rates.

The C time interval is preferably a relatively long time interval of hours, such as 12 or 24. Since in many locations, winds reverse directions for a short time at sunup and sundown, 12 hours is a preferred duration for the C time interval.

The D time interval can be virtually any duration, even as short as a millisecond. In the circuit of FIG. 5B the D time interval is 45 minutes, a time interval that is conveniently attainable. A shorter time interval may be preferable. The E time interval is preferably about 5 minutes. In the circuit of FIG. 5B it is 45 minutes because electrically that is convenient to obtain. With an integrated circuit having other counting abilities than the 4521 chip shown in FIG. 5B, this 45-minute interval could be readily shortened without adding complexity to the circuit.

Referring to FIG. 10, there is shown a schematic circuit diagram of an alternative embodiment of the invention that substitutes for integrated circuit chip U3 in FIG. 5C. This circuitry receives clock signals from external clocks on inputs designated Clock 1, Clock 2 and Clock 3 and provides an appropriate timing signal on output terminal 10 of the 4011 chip to pin 1 of integrated circuit U2 in FIG. 5C as a substitute for the signal provided by integrated circuit U3 there. Section I is a flip-flop that is flipped on at pin 3 in response to a signal on the Clock 1 input and flipped off in response to a signal on the Clock 2 input. When pin 3 is high and the signal on the Clock 3 input is off, timer section II trips.

Timer section II is a 1.5 minute timer. When pin 12 is high at power up, pin 13 is high so that pin 11 is low; pins 8 and 9 are then low so pin 10 is high. Capacitor $C_1$ charges, the diode cathode voltage drops through resistor R1 into pin 11. Capacitor $C_1$ becomes fully charged, pin 11 remains low, pins 8 and 9 are low so that pin 10 stays high.

If when pin 3 is high the signal on Clock 3 input trips, power from pin 3 is drained through the 100K resistor into the 2N4401 transistor so that pin 12 goes low. Pin 11 then goes high, pins 8 and 9 are high, pin 10 goes low, pin 13 is low, pin 11 remains high. Capacitor $C_1$ discharges through resistor R1 into pin 11 so that the diode cathode voltage slowly rises. During this discharge pin 12 goes back to high. The clocks provide output for 1 minute; therefore, this timer is adjusted to 1½ minutes when pins 8 and 9 rise above ½ $V_{DD}$ pin 13 goes high, pin 11 goes low, pins 8 and 9 are low, pin 10 goes high, and capacitor $C_1$ recharges.

An exemplary source for the clock signals are Micronta LCD 63-706 travel alarm clocks commercially available from Radio Shack Corporation. Each clock is typically slightly modified by disconnecting the alarm sounder and extending the wires that were connected to the alarm sounder by respective twisted lead pairs for the Clock 1, Clock 2 and Clock 3 inputs. It is convenient to have Clock 1 with red leads, Clock 2 with yellow leads and Clock 3 with black leads. The clocks are typically set to local time. Clock 1 is typically set to trigger or alarm at 4:45 P.M., Clock 2 typically at 7:55 A.M. and Clock 3 typically at 12:20 A.M. When Clock 1 triggers, it activates the controlled spraying system. When Clock 2 triggers, it deactivates the spraying system. When Clock 3 triggers, it deactivates the spraying system, but only for about 2 minutes. Typically this 2 minutes occurs half way through the active period between 4:45 P.M. and 7:55 A.M.

Thus, if during the day the invention is hung late in the afternoon, it will function normally until 12:20 A.M. At that time whatever wind direction memories were tripped between turn on and 12:20 A.M. will be reset. After 12:20 A.M. plus 2 minutes, approximately 12:22 A.M., the invention may then have a chance to spray six times. At 7:55 A.M. the unit will be disabled and remain nonfunctional until 4:45 P.M. When the unit is first turned on, it normally powers up in the active mode. If, for example, it is turned off at 3:00 P.M., it will spray in response to wind conditions until 7:55 A.M. (except for the 2 minutes interval at 12:20 A.M.). To avoid this possible spraying during working hours, it is preferable to turn it on at the last part of the working day, before or after 4:45 P.M. Both the trigger times and the clock times may be readily adjusted by following the instructions furnished with the clock for setting alarms.

To make the unit function normally on weekends or holidays, it is desirable to adjust the trigger times on two of the clocks. Set the trigger time of Clock 2 at 10 minutes before the trigger time of Clock 1; and set the trigger time of Clock 3 at 12 hours before or after that of Clock 1. This arrangement is advantageous for selectively spraying when people are outside the sprayed area.

Other embodiments are within the claims.

What is claimed is:

1. Spraying apparatus for spraying a liquid into moving air comprising:
   a wind sensor for sensing wind from a predetermined plurality of directions at a predetermined location, comprising a swinging rod carrying a swinging contact,
   a sprayer,
   an electric circuit,
   said electric circuit being operatively connected to said sprayer for intermittently initiating a spray into the air in response to movement of said swinging contact,
   a plurality of fixed switch contacts electrically connected to said electric circuit,
   said switch contacts being configured for intermittent contact with said swinging contact,
   an individual switch contact of said plurality of fixed switch contact being intermittently electrically connected by said swinging contact to another individual switch contact, causing said electric circuit to initiate said spray into the air,
   an insulator,
   said plurality of fixed switch contacts being fixedly mounted on said insulator,
   wherein said insulator is formed with an aperture,
   said fixed contacts include a plurality of insulatedly separated conducting pins spaced along the edge of the aperture with said pins beings generally perpendicular to said insulator,
   said swinging rod is plastic and passes through said aperture, and
   said swinging contact is a conductive washer that is mounted on said swinging rod and free to engage any one pair of said fixed contacts without contacting another of said fixed contacts.

2. The spraying apparatus of claim 1 further comprising
   a printed circuit board,
   said electric circuit being located on said printed circuit board.

3. The spraying apparatus of claim 2 wherein said printed circuit board comprises said insulator.

4. The spraying apparatus of claim 1 further comprising a housing above said printed circuit boards,
   said housing comprising a protector for protecting said fixed contacts from environmental elements and carrying a support rod.

5. The spraying apparatus of claim 4 wherein
   said swinging rod is freely suspended from said support rod, and
   said swinging contact is intermittently in contact with a pair of said fixed switch contacts when moved by the wind.

6. The spraying apparatus of claim 1 further comprising inwardly projecting fingers between each said pair of said fixed switch contacts, said fingers preventing said swinging contact from simultaneously contacting more than one of said fixed switch contact pairs and quickly shifting from one of said fixed switch contact pairs to another in response to small changes in wind direction.

7. Spraying apparatus in accordance with claim 3 wherein, said swinging rod is insulated from said printed circuit board.

8. Spraying apparatus in accordance with claim 1 wherein said swinging rod comprises an end piece having a thread attached thereto.

9. Spraying apparatus in accordance with claim 1 wherein,
   said electric circuit is configured to control the occurrence and duration of spraying.

10. The spraying apparatus in accordance with claim 9 wherein,
    said electric circuit includes a memory,
    said memory being configured to store information related to said spraying intervals,
    said memory being configured to clear said memory after a specified amount of time has elapsed.

11. The spraying apparatus in accordance with claim 10 wherein,
said specified amount of time is twelve hours.

12. Spraying apparatus in accordance with claim 1 wherein,
said electric circuit includes,
a battery having a voltage, and adjustment circuitry configured to adjust a duty cycle based upon said battery voltage,
said duty cycle being inputted to said sprayer to provide power to said sprayer,
said power being substantially uniform due to said adjusted duty cycle.

13. Spraying apparatus in accordance with claim 1 and further comprising,
a wind direction memory in said electric circuit for storing information representative of wind direction,
said wind direction memory being coupled to said fixed switch contacts for receiving wind direction information.

14. Spraying apparatus for spraying a liquid into moving air comprising:
a wind sensor for sensing wind from a predetermined plurality of directions at a predetermined location, comprising a swinging rod carrying a swinging contact,
a sprayer,
an electric circuit,
said electric circuit being operatively connected to said sprayer for intermittently initiating a spray into the air in response to movement of said swinging contact,
a plurality of fixed switch contacts electrically connected to said electric circuit,
said switch contacts being configured for intermittent contact with said swinging contact,
an individual switch contact of said plurality of fixed switch contacts being intermittently electrically connected by said swinging contact to another individual switch contact, causing said electric circuit to initiate said spray into the air, wherein,
said switch contacts are substantially circularly oriented, some of said switch contacts being located on a first circle having a slightly larger radius than a second circle on which others of said switch contacts are located, to provide more switch contact pairs than half the total number of said switch contacts.

15. The spraying apparatus of claim 14 wherein, there are nine of said switch contacts with every third one of said switch contacts on said second circle.

16. A method of controlled spraying into air in all directions about a predetermined location to chemically treat the region around said predetermined location, said air being subject to movement when wind occurs comprising,
sensing each occurrence of the wind exceeding a predetermined velocity from a predetermined plurality of directions at said predetermined location,
intermittently providing a chemical spray into said air for a predetermined time interval from said predetermined location upon sensing only predetermined ones of said occurrences for at least a predetermined time interval to chemically treat said region.

17. Spraying apparatus for controlled spraying into air in all directions about a predetermined location to chemically treat the region around said predetermined location, said air being subject to movement when wind occurs comprising,
means for sensing each occurrence of the wind exceeding a predetermined velocity from a predetermined plurality of directions at said predetermined location, and
means for intermittently providing a chemical spray into said air for a predetermined time interval from said predetermined location upon sensing only predetermined ones of said occurrences for at least a predetermined time interval to chemically treat said region.

18. Spraying apparatus in accordance with claim 16 wherein said means for intermittently providing a spray includes means responsive to the occurrence of a predetermined one of said occurrences for furnishing a spray signal that initiates spraying only after said predetermined time interval and including delay means for establishing said predetermined time interval.

19. Spraying apparatus in accordance with claim 18 wherein said delay means is electrical.

20. Spraying apparatus in accordance with claim 18 wherein said delay means is mechanical.

21. Spraying apparatus in accordance with claim 20 wherein said mechanical delay means comprises a pendulum member having one end free to move in the wind and the other end residing in viscous fluid.

22. Spraying apparatus for controlled spraying into air subject to movement when wind occurs comprising,
means for sensing each occurrence of the wind exceeding a predetermined velocity from a predetermined plurality of directions at a predetermined location, and
means for intermittently providing a spray into said air for a predetermined time interval from said predetermined location upon sensing only predetermined ones of said occurrences for at least a predetermined time interval,
wherein said means for intermittently providing a spray includes means responsive to the occurrence of a predetermined one of said occurrences for furnishing a spray signal that initiates spraying only after said predetermined time interval and including delay means for establishing said predetermined time interval,
wherein said delay means is mechanical,
wherein said mechanical delay means comprises a spring wire carried by a ball pivot.

23. A method of controlled spraying into air subject to movement when wind occurs comprising,
sensing each occurrence of the wind exceeding a predetermined velocity from a predetermined plurality of directions at least two spaced predetermined locations, and intermittently providing a spray into said air for a predetermined time interval [upon sensing only predetermined ones of said occurrences]]when said wind is from the same direction at both spaced locations.

24. A method of controlled spraying into air in all directions about a predetermined location to chemically treat the region around said predetermined location, said air subject to movement when wind occurs comprising,
sensing each occurrence of the wind exceeding a predetermined velocity from a predetermined plurality of directions at said predetermined location, intermittently providing a chemical spray into said air for a predetermined time interval from said predetermined location upon sensing only predetermined ones of said occurrences only if the predetermined one of said occurrences is the wind from a selected one of said directions maintained for a predetermined transient time interval of at least two seconds.

25. A method of controlled spraying in accordance with claim 24 wherein said spray is provided so that the spray provided upon sensing a said occurrence from each direction is substantially equal to that provided upon sensing said occurrences from each of the other directions.

26. A method of controlled spraying according to claim 24 and further comprising,
mixing a source of a solute to be dispersively applied over a given area with a carrier flow of liquid to produce a mixed flow of liquid,
spraying said mixed flow into the air as a fogged dispersion of fine liquid particles seeded with solute, and,
controlling conditions of spraying to evaporate at least the majority of carrier liquid from said solute before the sprayed particles strike the ground.

27. A method of controlled spraying in accordance with claim 26 wherein said source of solute comprises a solution thereof which is suspendable in said carrier liquid,
the selection of solution solvent and spray trajectory of said liquid particles being controlled to evaporate a majority of said solvent before the sprayed particles reach the ground.

28. A method of controlled spraying in accordance with claim 26 and further comprising,
blowing a gas to enhance the horizontal component wind blown trajectory of said particles.

29. A method of controlled spraying in accordance with claim 24 and further including the steps of providing a spray upon sensing the wind exceeding a predetermined velocity from each of said plurality of directions only once in a selected time interval that is much greater than said predetermined time interval.

30. A method of controlled spraying in accordance with claim 28 wherein said selected time interval is of the order of 24 hours.

31. A method of controlled spraying in accordance with claim 30 wherein said spray is provided upon sensing said occurrences so that the spray provided upon sensing a said occurrence from each direction is substantially equal to that provided upon sensing an occurrence from each of the other directions.

32. A method of controlled spraying in accordance with claim 24 and further comprising,
mixing a source of spray material to be dispersively applied over a given area with a carrier flow of liquid to produce a mixed flow of liquid,
spraying said mixed flow into the air as a dispersion of fine liquid particles seeded with said material,
and controlling conditions of spraying to evaporate at least the majority of carrier liquid from said material before the sprayed particles strike the ground.

33. A method of controlled spraying in accordance with claim 25 wherein said source of material comprises a solution thereof in nonaqueous solvent which is suspendable in aqueous carrier liquid,
said carrier liquid being water,
the selection of solution solvent and spray trajectory of said liquid particles being controlled to evaporate a majority of the solvent and carrier liquid therein before the sprayed particles reach the ground.

34. A method of controlled spraying in accordance with claim 26 and further comprising,
blowing a gas to enhance the horizontal component of wind blown trajectory of said particles.

35. A method of controlled spraying in accordance with claim 25 wherein the material sprayed is an insecticide chemical and said source comprises an insecticide solute in a solvent which is suspendable in water and said carrier liquid comprises water.

36. A method of controlled spraying in accordance with claim 35 wherein dilution of said solute in said mixed flow is at least ten times its dilution in said solution.

37. A method of controlled spraying in accordance with claim 36, and further comprising,
monitoring an indicator of spray concentration and adjusting mixing ratio of said carrier and solution to substantially maintain a preselected concentration.

38. A method of controlled spraying in accordance with claim 35 and further comprising,
determining shifts in wind direction in a region to be protected,
automatically initiating spraying in said region upon detection of at least one wind shift to a new direction for at least said predetermined transient time interval,
terminating each such spraying operation at a first preselected time interval after initiation,
and suppressing further initiations of spraying in response to shift of wind to a given direction for a second time interval after a prior initiation of spraying in response to first shifts of wind to said directions.

39. A method of controlled spraying in accordance with claim 38 and further comprising,
automatically initiating said spraying in response to first shifts of wind to any of multiple directions for at least said predetermined transient time interval.

40. A method of controlled spraying in accordance with claim 39 wherein said first time interval is no greater than 150 seconds.

41. A method of controlled spraying in accordance with claim 39 wherein said second time interval is essentially at least 1 hour.

42. A method of controlled spraying in accordance with claim 41 wherein said second time interval is at least 8 hours.

43. Spraying apparatus for controlled spraying into air in all directions about a predetermined location to chemically treat the region around said predetermined location, said air being subject to movement when wind occurs, comprising,
means for sensing each occurrence of the wind exceeding a predetermined velocity from a predetermined plurality of directions at said predetermined location, and
means for intermittently providing a spray into said air for a predetermined time interval from said predetermined location upon sensing only predetermined ones of said occurrences only if the predetermined one of said occurrences occurs for a predetermined time interval of a short transient change in wind direction which transient time interval is sufficiently long to provide a spray when the wind direction is maintained for a predetermined transient time interval of at least two seconds to chemically treat said region.

44. Spraying apparatus in accordance with claim 43 and further comprising,
   means defining a pressurized carrier liquid source,
   means for mixing carrier liquid from said carrier liquid source with insecticide from said insecticide source to produce a spray mixture,
   and means for dispersing and spraying said spray mixture.

45. Spraying apparatus in accordance with claim 43 and further comprising,
   blocking means for blocking spraying,
   means for unblocking said blocking means in response to an initiating and latching signal,
   signal producing means for producing an initiating and latching signal in response to sensing a predetermined one of said occurrences,
   means for suppressing production of a new initiating and latching signal by said signal producing means until reset, and
   means for so resetting said signal producing means.

46. Spraying apparatus in accordance with claim 45 wherein said means for blocking and unblocking comprises an electrically operated valve,
   said signal producing means comprises electrical power source means connected in circuit to said electrically operated valve via a gated solid state valve,
   means for producing a gating signal to said valve in response to a change in wind direction to close said circuit, and
   means responsive to closing a said circuit for reopening said circuit after said first interval without resetting said solid state valve.

47. Spraying apparatus in accordance with claim 46 wherein said means for reopening said circuit comprises heat responsive switch means in said circuit responsive to heating to open the circuit and an electrical heater therefor,
   said electrical heater being connected to said circuit in series with said solid state valve.

48. Spraying apparatus in accordance with claim 46 and further comprising,
   a plurality of gating signal producing means together with associated wind direction change responsive switches in parallel in said circuit,
   said switches being responsive to changes in different directions of the wind.

49. Spraying apparatus in accordance with claim 48 wherein said plural gating signal producing means comprise latching SCR circuits interconnected in parallel to a gate electrode of said solid state valve by parallel solid state coupling networks,
   and further comprising,
   means effective during operation of said valve in response to one of said circuits being closed to prevent closing of any of the other circuits.

50. Spraying apparatus for controlled spraying into air in accordance with claim 48 and further comprising memory means for storing a signal representative of the most recent wind direction occurring for at least said predetermined transient time interval,
   a storage element for providing a signal representative of the time a new wind direction of said predetermined velocity has occurred,
   and means responsive to the signal provided by such storage element indicating said wind direction has exceeded said predetermined velocity for said predetermined transient interval for providing a switching signal that switches said memory means to then store a signal representative of the contemporary wind direction and activates said means for intermittently providing a spray to provide a spray into said air for said predetermined time interval.

51. Spraying apparatus comprising,
   means for sensing each occurrence of moving air exceeding a predetermined velocity from a predetermined plurality of directions at at least two spaced predetermined locations, and
   means for intermittently providing a spray into said air for a predetermined time interval from at least one of said predetermined locations upon sensing only predetermined ones of said occurrences when said moving air is from the same direction at both said spaced predetermined locations.

52. A method of controlling wind-responsive chemical dispensing apparatus which method includes the steps of,
   sensing the occurrence of the air movement exceeding a predetermined speed in said selected direction for a predetermined time interval,
   and causing said wind-responsive apparatus to dispense said chemical into said air only upon sensing said occurrence of the air movement exceeding said predetermined speed in said selected direction for said predetermined time interval.

53. A method in accordance with claim 52 wherein said sensing step includes sensing the charge on a timing capacitor.

54. A method in accordance with claim 52 wherein said sensing step includes counting a number of electrical pulses.

55. A method in accordance with claim 52 wherein said sensing step includes sensing the condition of a mechanical delay element.

56. A method in accordance with claim 52 wherein said sensing step includes sensing the conditions of both an electrical and a mechanical delay element.

57. A method in accordance with claim 52 and further including the step of restarting the sensing step when the predetermined condition occurs before the end of said predetermined time interval.

58. A method in accordance with claim 52 and further including the step of maintaining the sensing step without restarting when the predetermined condition is interrupted for a predetermined short time interval less than said predetermined time interval.

59. A method in accordance with claim 52 and further including the steps of turning said apparatus on,
   and disabling said apparatus for a predetermined safety time interval when said apparatus is turned on.

* * * * *